United States Patent
Sugata et al.

(10) Patent No.: US 6,644,900 B1
(45) Date of Patent: Nov. 11, 2003

(54) SPINDLE DEVICE OF MACHINE TOOL

(75) Inventors: Shinsuke Sugata, Fukuyama (JP); Yoshihide Seo, Hiroshima (JP); Takashi Kobayashi, Fukuyama (JP)

(73) Assignee: Horkos Corp., Hiroshima (JP)

( * ) Notice: Subject to any disclaimer, the term of this patent is extended or adjusted under 35 U.S.C. 154(b) by 0 days.

(21) Appl. No.: 10/018,255

(22) Filed: Dec. 18, 2001

(30) Foreign Application Priority Data

Jul. 9, 1999 (JP) .......................................... 11/196231

(51) Int. Cl.$^7$ .............................. B23C 9/00; B23Q 11/10
(52) U.S. Cl. ............................. 409/136; 408/57; 408/59
(58) Field of Search ................................. 409/136, 135, 409/233, 234; 408/57, 59

(56) References Cited

U.S. PATENT DOCUMENTS

| | | | | |
|---|---|---|---|---|
| 5,150,994 A | * | 9/1992 | Hsu ........................... | 409/135 |
| 5,649,714 A | | 7/1997 | Uchida et al. | |
| 5,676,506 A | * | 10/1997 | Sugata ........................ | 409/136 |
| 5,690,137 A | * | 11/1997 | Yamada ...................... | 137/240 |
| 6,238,152 B1 | * | 5/2001 | Fujimoto et al. ........... | 409/233 |
| 6,435,232 B2 | * | 8/2002 | Tanigawa ................... | 141/384 |
| 6,582,167 B1 | * | 6/2003 | Sugata et al. ............... | 409/136 |

FOREIGN PATENT DOCUMENTS

| | | | | |
|---|---|---|---|---|
| EP | 1211019 | * | 6/2002 | ................. 409/136 |
| JP | 46477/1991 | | 11/1992 | |
| JP | 6-8103 | | 1/1994 | |
| JP | 9-66437 | | 3/1997 | |
| JP | 2695906 | | 9/1997 | |
| JP | 10-94942 | * | 4/1998 | ................. 409/233 |
| JP | 10-249669 | | 9/1998 | |
| JP | 411333663 A | * | 12/1999 | ................. 409/136 |
| JP | 00-210836 | | 8/2000 | |

* cited by examiner

Primary Examiner—A. L. Wellington
Assistant Examiner—William Briggs
(74) Attorney, Agent, or Firm—Venable LLP; John P. Shannon

(57) ABSTRACT

A spindle device of a machine tool stably spouting spray coolant from the tip of a tool (26) in a tool holder (25) and suppressing a waste of the spray coolant, wherein the tool holder (25) is fixed to the tip part of a spindle (2) mechanically detachably through a clamp device (KR), an extension passage (101) is formed in the state that an in-spindle spray coolant passage (100) formed in the center part of the spindle (2) is extended forward (f2), and the in-spindle spray coolant passage (100) is formed to communicate with an in-holder spray coolant passage (102) formed in the center part of the tool holder (25) through the extension passage (101).

4 Claims, 3 Drawing Sheets

SPINDLE DEVICE OF MACHINE TOOL

FIELD OF THE INVENTION

The present invention relates to a spindle device of a machine tool spouting spray coolant from the tip of a tool.

BACKGROUND OF THE INVENTION

As to machining by machine tools, much coolant is supplied into machining points to cool and lubricate workpieces and tools, or to eliminate cutting chips. In this case, there are many problems, such as ill effects to an environmental pollution and human health due to coolant, high cost resulting from waste oil disposal of the coolant, shortening the life of a tool resulting from undercooling the workpieces, and sliding friction due to excessive coolant at a minute slitting of a tool. Besides, much coolant adheres to the cutting chips in machining, and therefore, when treating and recycling the cutting chips, the adhesive coolant needs separating from the machine tool.

In recent years, to settle the above problems, there appear machine tools performing so-called dry cutting that cut as supplying spray into machining points. Here, the spray is formed from a very small quantity of coolant.

Applicant has already practiced a machine tool for the dry cutting, for example, its spindle device is like FIG. 3.

In this figure, 2 is a spindle, 10 is a canister, 11 is a steel ball, 12 is a clamp-rod, 13 is a transiently clamping ring member, 14 is a receiving spring ring, 15 is a compression spring, 16 is a longitudinal guiding bar member, 17 is a gas-liquid passage, 18 is a coolant atomizing means, 103 is a coolant nozzle hole member, and 22 is a disc spring. The atomizing means 18 comprises an atomizing nozzle 23, a compressed air supplying valve 24, and a compression spring 19. The numeral 31 is a pull-stud of a tool holder.

In thus structure, a central hole of the compressed air supplying valve 24, a front central hole of the longitudinal guiding bar member 16 and an inner hole of the coolant nozzle hole member 103 form an in-spindle spray coolant passage 100. Besides, a central hole of the pull-stud 31 forms an in-holder spray coolant passage 102.

The above spindle device is operated as the following. That is, spray coolant spouts from an outlet of the atomizing nozzle 23 within the spindle 2 into the in-spindle spray coolant passage 100. The spouted spray coolant flows from the coolant nozzle hole member 103 into the canister 10 having a comparative large diameter, and then, flows into the air from the tip of the tool through the in-holder spray coolant passage 102 and a spray coolant passage formed in the center of the tool fixed to the tool holder.

According to this kind of machine tool, even if the tool cuts deep positions of workpieces, a tool machining part is effectively lubricated by the spray coolant spouted from the tip of the tool. Accordingly, cutting is rationally achieved.

However, in the above conventional machine tool, the spray coolant which has reached the inside of the central hole of the longitudinal guiding bar member 16, flows into the air through openings between its parts. Therefore the coolant is wasted.

In addition, because the central hole of the longitudinal guiding bar member 16 has a diameter comparative larger than those of front and rear passages, the reached spray coolant is liquidized. Therefore the liquefaction hinders stable supply of the coolant to the machining position of the workpiece, as well as response to orders to start or stop spouting the spray coolant from the tip of the tool.

An object of the invention is to provide a spindle device of a machine tool that can settle the above problems.

SUMMARY OF THE INVENTION

To achieve the above object, the invention is characterized by a spindle device of a machine tool that fixes a pull-stud of a tool holder on the tip of a spindle through clamping means mechanically detachably. As shown therein, an extension passage is formed in the state that an in-spindle spray coolant passage formed in the center of the spindle is extended forward. Besides, the in-spindle spray coolant passage is communicated with an in-holder spray coolant passage formed in the center of the tool holder through the extension passage.

Accordingly, the in-spindle spray coolant passage, the in-holder spray coolant passage and the extension passage are hardly different in their diameters, thereby communicating closely each other. Therefore, spray coolant passing these passages is prevented liquefying due to differences between their diameters, and stably spouts from the tip of the tool of the tool holder. Besides, since these passages communicate with each other closely, the spray coolant is prevented flowing in vain into the air through the openings between the parts of the machine tool. Moreover, since the extension passage is formed to the spindle side, a structure of the conventional tool holder can be used as it is.

This invention can be materialized as follows.

That is, a slipping prevention ring member is mounted on the tip of the central hole of a little to the pull-stud of the longitudinal bar member, and the extension passage member is freely displaced in longitudinal direction of the tool holder through the slipping prevention ring. The extension passage member forms a cylinder, and is pressed forward by a spring, and therefore its tip projects out of the slipping prevention ring. Accordingly, regardless of rotations of the spindle, the coolant passages of the extension passage member and the coolant atomizing means can keep their close connection by spring force.

Besides, a flange is provided to the rear end face of the extension passage member, so as not to slip out from the slipping prevention ring in displacing slidably.

The tip of the extension passage member always projects forward from the slipping prevention ring by spring force.

PREFERRED EMBODIMENT OF THE PRESENT INVENTION

An explanation about the present invention will follow with reference to figures.

Figure 1:
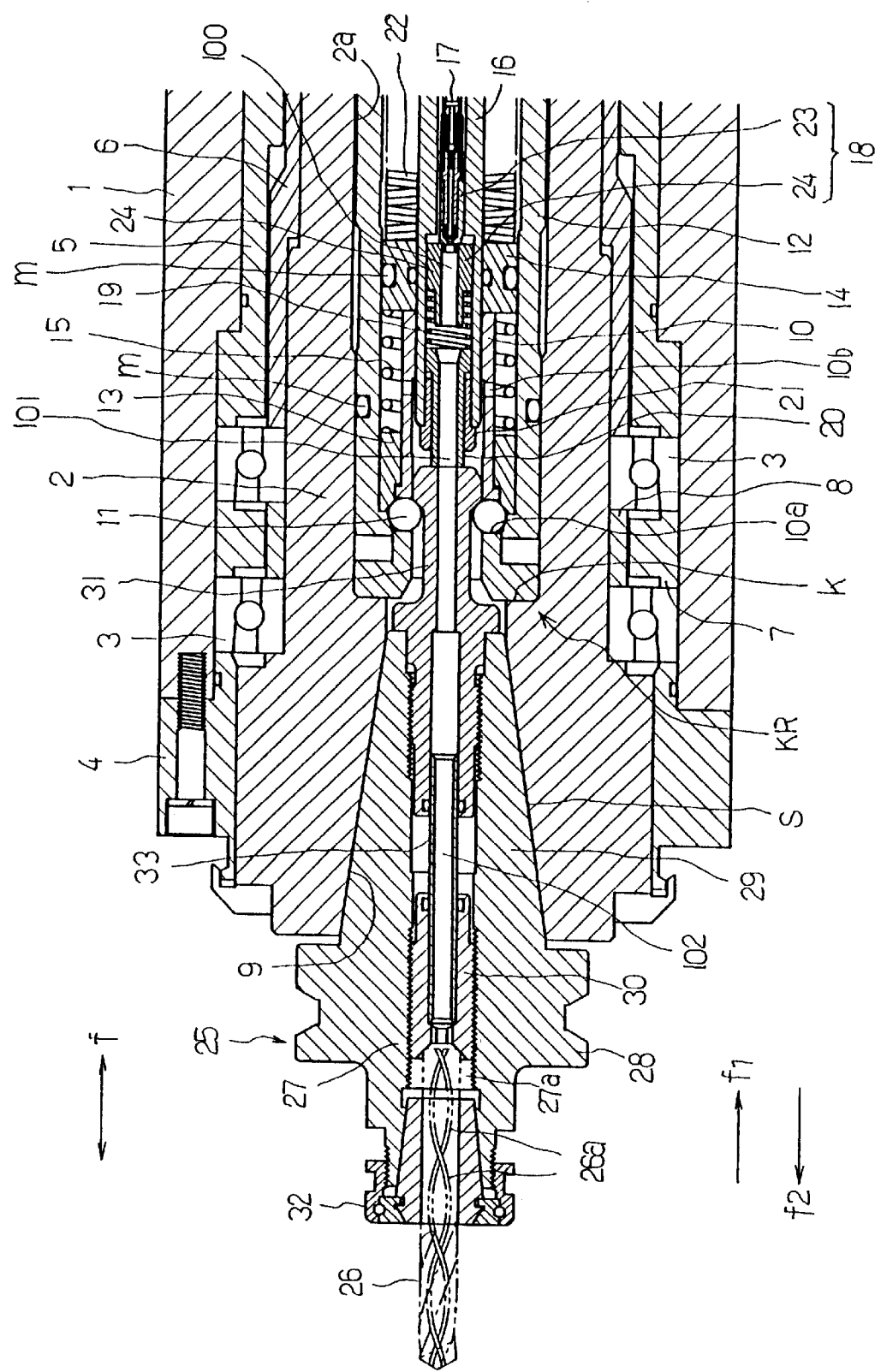
FIG. 1 is a sectional view at side sight of a spindle device of a machine tool related to an embodiment of the invention.
Figure 2:
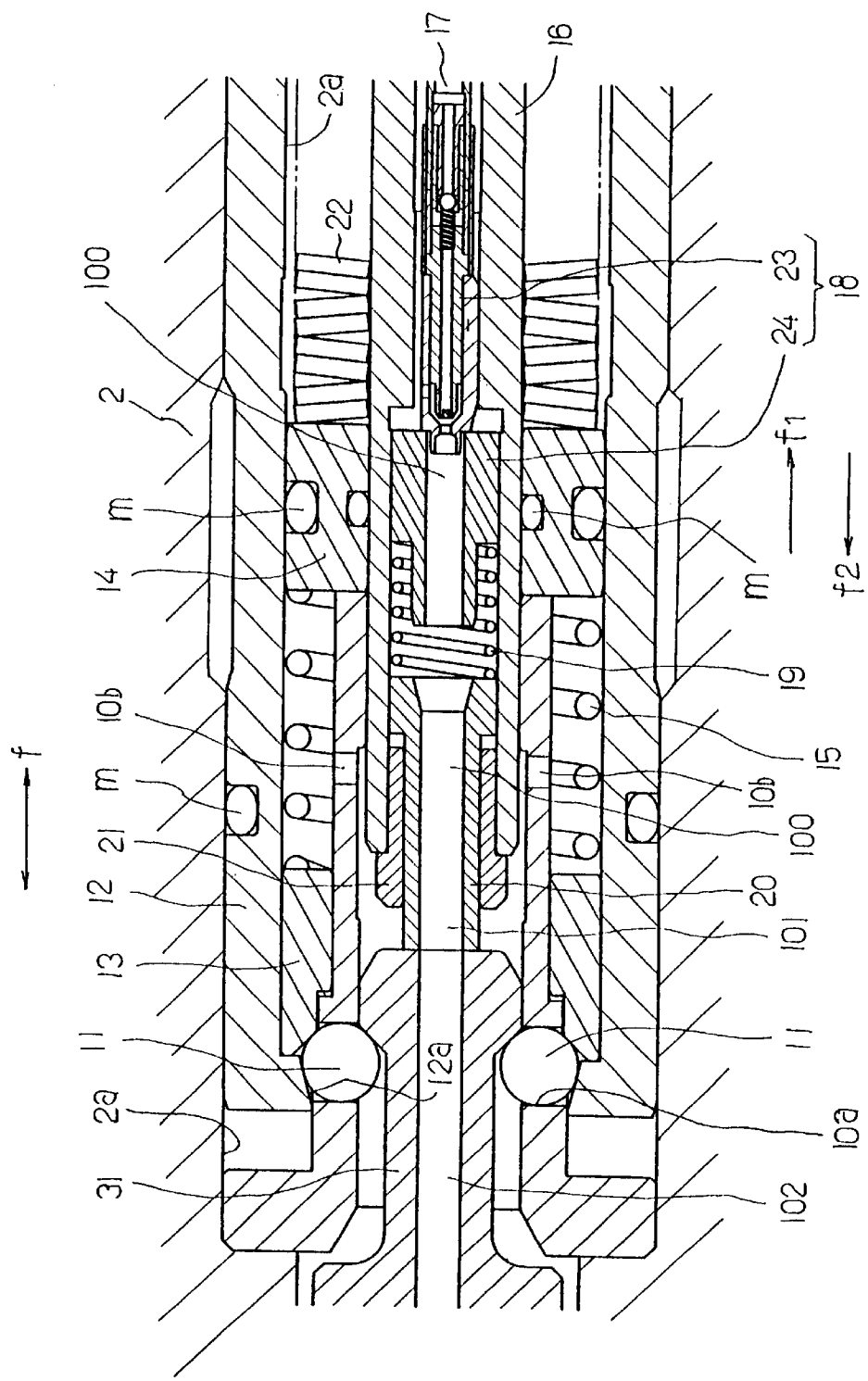
FIG. 2 is an enlarged side view of a main part of the above spindle device.
Figure 3:
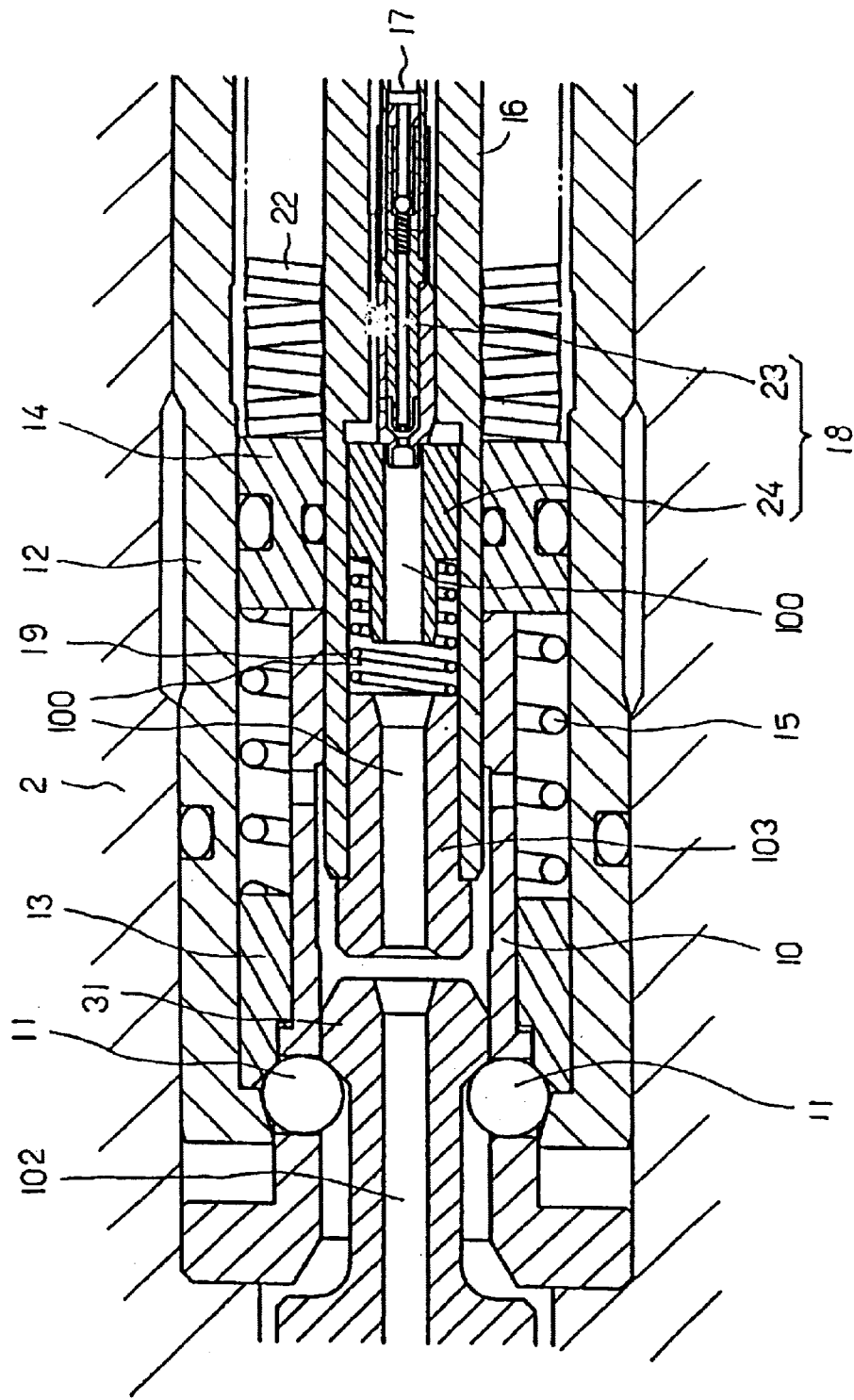
FIG. 3 is a sectional view at side sight of a part of a spindle device of a conventional machine tool.

In figures 1 is a spindle supporting frame of a machine tool, 2 is a spindle, which is rotatively supported by a bearing 3. Numeral 4 is a ring member to regulate each displacement of the bearing 3 and the spindle 2 in longitudinal direction "f", which is fixed on a front end face of the frame 1 by bolts. Spacers 5, 6, 7, 8 are provided between the frame 1 and the spindle 2, as well as the bearing 3 and the bearing 3.

Clamping means KR are formed in the center of the spindle 2.

That is, a front end of an inner hole 2a formed in the center of the spindle 2 is made a tapered interfitted hole 9. A canister 10 is inserted into the inner hole 2a, and fixed thereon in support of its front end on a stage "k". The canister 10 is cylindrical, having circular holes 10a on its front peripheral wall so as to displace steel balls 11 in a spindle radial direction as well as so as to guide them not to fall thereinto. Besides, an escape hole 10b is penetrated at the middle of the peripheral wall length.

On outer circumference of the canister 10, is externally fitted a clamp-rod 12 guided into the inner hole 2a of the spindle 2 so as to be slidably displaced in the longitudinal direction "f". A front end of the clamp-rod 12 forms a tapered face 12a to push the steel balls in the spindle radial direction. Besides, in an inner hole of the clamp-rod 12, is inserted a transiently clamping ring member 13 so as to be externally fitted on the canister 10, as well as a receiving spring ring 14 so as to be supported on a rear end of the canister 10. In this case, 15 is a compression spring provided between the transiently clamping ring member 13 and the receiving spring ring 14.

A longitudinal guiding bar member 16 is located at the center of the clamping means KR, and its front is internally fitted to an inner hole of the receiving spring ring 14, and fixed thereon. Into a central hole of the longitudinal guiding bar member 16, in due order from its rear, are internally inserted a gas-liquid passage 17, a coolant atomizing means 18, a compression spring 19 and an extension passage member 20. Besides, a slipping prevention ring 21 is fitted on its front end. Moreover, a disk spring 22 is externally inserted to the longitudinal guiding bar member 16 in multi-layer so as to suppress the clamp-rod 12 backward f1.

In this case, the gas-liquid passage 17 has a tube member concentrically with the central hole of the longitudinal guiding bar member 16. Here, an inner hole of the tube member forms a coolant passage, and an interval between the central hole and the tube member forms a compressed air passage. The atomizing means 18 comprises an atomizing nozzle 23 and a compressed air supplying valve 24. The compression spring 19 pushes the compressed air supplying valve 24 toward a backward atomizing nozzle 23 side f1, and pushes the extension passage member 20 toward a forward pull-stud side f2. The extension passage member 20 is made a cylindrical body having a flange on its rear end, and guided slidably in longitudinal direction inside a central hole of the slipping prevention ring 21. Here, the flange is engaged on the slipping prevention ring 21, thereby preventing the extension passage member 20 slipping forward f2.

Numeral 25 is a tool holder having a tool 26 on its tip, comprising a holder main body 27, a holder grip 28 and a tapered interfitting axis 29.

The holder main body 27 has a central hole 27a whose front part and rear part are female screws. The front female screw joints a tool stopper 30, and the rear one joints a pull-stud 31. The tool 26 has a spray coolant passage 26a at its center, and is inserted from the front of a central hole 27a of the holder main body 27. Here, a rear end of the tool 26 is engaged on the tool stopper 30, and combined by a fastener 32 mounted on the front of the holder main body 27. A central hole of the tool stopper 30 is communicated with each central hole of the pull-stud 31 through a communicating tube 33 admitting their longitudinal displacement.

The holder grip 28 is grasped by a not-illustrated automatic tool change device. Besides, the tapered interfitting axis 29 is formed so that a tapered male face S of its outer circumference is fitted into the tapered interfitted hole 9 of the spindle 2.

As shown in FIG. 1, in the state that the tapered male face S is internally fitted to the interfitted hole 9 as well as the pull-stud 31 is grasped by the clamping means KR, the tip of the extension passage member 20 is pressed forward f2 by elasticity of the compression spring 19, and keeps being pressed closely to a rear face of the pull-stud 31.

In thus structure, the in-spindle spray coolant passage 100 comprises the central hole of the compressed air supplying valve 24, the front central hole of the longitudinal guiding bar member 16 and the rear inner hole of the extension passage member 20, and besides, the front inner hole of the extension passage member 20 forms an extension passage 101. The in-holder spray coolant passage 102 comprises the central hole of the pull-stud 31, the inner hole of the communicating tube 33 and the inner hole of the tool stopper 30.

In these figures, "m" is a gum sealing member.

In the above spindle device, as shown in FIG. 1, when installing and detaching the tool holder 25 grasped on the spindle 2 side, first of all, a not-illustrated draw-bar is displaced forward f2. Hence, the clamp-rod 12 is displaced forward f2, so that its tapered face 12a separates from the steel ball 11. With respect to this operation, the transiently clamping ring member 13 is displaced forward f2 by elasticity of the compression spring 15, and its front tapered face presses slightly the steel ball 11 in inward spindle radial direction. Accordingly, the tool holder 25 is released from the above clamped state, and comes to be pulled out by the transiently clamping ring member 13 in the state that spontaneous detachment is prevented.

In thus state, the automatic tool change device pulls the tool holder 25 out forward f2 with grasping the holder grip 28, and fits the tapered interfitting axis 29 of a different tool holder 25 into the interfitted hole 9 from its front.

Thereafter, the clamp-rod 12 is displaced backward f1 so that the draw-bar may be displaced backward f1 by elasticity of the disk spring 22. Here, the steel ball 11 is engaged on the tapered face 12a of the clamp-rod 12, displaced in the inward radial spindle direction, and pressed to an engaging slope of a rear extensive part of the pull-stud 31. Therefore, the pull-stud 31 is pressed backward by the steel ball 11, the tapered male face S of the interfitting axis 29 is pressed to the interfitted hole 9, and the tool holder 25 is grasped by the clamping means KR.

In the state that the tool holder 25 is grasped, during the spindle 2 rotating, when the spray coolant spouts from the tip of the tool 26, the compressed air and the coolant are separately supplied from the outside of the spindle 2 into the gas-liquid passage 17 at adequate pressure. In this case, each element is operated as the following.

That is, the gas-liquid passage 17 supplies the coolant and the compressed air to the atomizing nozzle 23. The atomizing nozzle 23 spouts them into the in-spindle spray coolant passage 100 of an inner hole of the compressed air supplying valve 24 as mixing and stirring them, thereby forming spray coolant. The in-spindle spray coolant passage 100 sends the spray coolant into the extension passage 101 consisting of the inner hole of the extension passage member 20.

Then, the in-holder spray coolant passage 102 sends the spray coolant within the extension passage 101 into the spray coolant passage 26a, and the spray coolant spouts from the tip of the tool 26.

In this case, the extension passage 101 is closely communicated with the in-holder spray coolant passage 102, thereby preventing much spray coolant flowing into a large diameter space outside the extension passage 101 (which is an inner hole of the canister 10) as well as scattering in vain to the air from openings between the parts. The in-spindle spray coolant passage 100, the extension passage 101 and the in-holder spray coolant passage 102 are hardly different in their diameters at their longitude, thereby preventing the spray coolant liquefying due to their vast magnified or reduced passages as well as spouting stably from the tip of the tool 26.

UTILITY VALUE IN THE INDUSTRY

The present invention has the following effects.

According to the invention, the in-spindle spray coolant passage, the in-holder spray coolant passage and the extension passage are hardly different in their diameters at their longitude. Besides, since these passages are closely communicated with each other, the spray coolant which passes through these passages is prevented liquefying due to vast differences between their diameters. Therefore, a response to orders to spout the spray coolant from the tip of the tool of the tool holder comes to be good, and the spout is stably performed. Moreover, since the spray coolant is prevented flowing into the air through openings between the parts, its waste is prevented. Furthermore, the structure of the extension passage member of the present invention can use the structure of the conventional tool holder as it is. Besides, the structure of the conventional spindle side can be used almost as it is, and a part of it is only improved easily. Accordingly, cheap and convenient use can be accomplished.

According to the invention, the extension passage member 20 is freely displaceable in a longitudinal direction of the tool holder 25, and pressed toward the tool holder by the compression spring 19, and a front end face of the extension passage member 20 is pressed against a rear end face of a structure defining the in-holder spray coolant passage 102 by the spring 19. Thus, regardless of rotations of the spindle, the front end of the extension passage and the rear end of the in-holder spray coolant passage keep their close connection by spring force.

According to the invention, the rear end face of a structure defining the inholder spray lubricating coolant passage 102 is a rear end face of the pull-stud 31 grasped by the clamping means KR. Thus, the structure of the conventional tool holder can be used as it is.

According to the invention, the extension passage is an extension toward the tool holder 25 of an in-spindle spray lubricating coolant passage 100 located at the center of the spindle 2 in the longitudinal guiding bar member 16. Thus, each structure of the conventional tool holder and spindle can be almost used as it is.

What is claimed is:

1. A spindle device of a machine tool comprising:

a spindle (2);

a tool holder (25) mechanically detachably fixed on a tip of said spindle (2) by clamping means (KR) having a center, a pull stud (31) being connected to said tool holder;

a longitudinal guiding bar member (16) located in the center of said clamping means (KR);

a slipping prevention ring member (21) mounted on said longitudinal guiding bar member (16);

an extension passage member (20) inserted slidably through said slipping prevention ring member (21), the extension passage member defining a cylinder having an extension passage (101) and a projecting tip; and a flange formed on an end of said extension passage member (20) distal to said tool-holder to prevent, by engaging with the slipping prevention ring member (21), said extension passage member from slipping, the longitudinal guiding bar member having in a central hole, in order from an end distal to said tool holder to an opposite end, a gas-liquid passage (17), a lubricating coolant atomizing means (18) comprising an atomizing nozzle (23) and a compressed air supplying valve (24), a compression spring (19) and the extension passage member (20), wherein said compressed air supplying valve (24) is pressed toward said atomizing nozzle (23) by said compression spring (19), and said extension passage member (20) is pressed toward the pull-stud (31) so that its tip always projects from a tip of said slipping prevention ring member (21); and said extension passage is in fluid communication with an in-holder spray lubricating coolant passage (102) formed in a center of said tool holder (25).

2. A spindle device of a machine tool as set forth in claim 1, wherein said extension passage member (20) is freely displaceable in a longitudinal direction of said tool holder (25), and pressed toward said tool holder by said compression spring (19); and wherein a front end face of said extension passage member (20) is pressed against a rear end face of a structure defining the in-holder spray lubricating coolant passage (102) by said spring (19).

3. A spindle device of a machine tool as set forth in claim 2, wherein said rear end face of a structure defining the in-holder spray lubricating coolant passage (102) is a rear end face of the pull-stud (31), the pull-stud being grasped by the clamping means (KR).

4. A spindle device of a machine tool as set forth in claim 1, wherein said extension passage (101) is an extension toward the tool holder (25) of an in-spindle spray lubricating coolant passage (100) located at the center of the spindle (2) in said longitudinal guiding bar member (16).

* * * * *

UNITED STATES PATENT AND TRADEMARK OFFICE
CERTIFICATE OF CORRECTION

PATENT NO.    : 6,644,900 B1
DATED         : November 11, 2003
INVENTOR(S)   : Shinsuke Sugata et al.

It is certified that error appears in the above-identified patent and that said Letters Patent is hereby corrected as shown below:

<u>Title page,</u>
Insert:
-- [22] PCT Filed: July 30, 2000,
  [86] PCT No.: PCT/JP00/04387,
  [87] PCT Pub. No.: WO 01/03884,
     PCT Pub. Date: January 18, 2001 --.

Signed and Sealed this

Second Day of March, 2004

JON W. DUDAS
*Acting Director of the United States Patent and Trademark Office*